United States Patent [19]

Jones, Jr.

[11] 3,743,054
[45] July 3, 1973

[54] TRAILER FIFTH-WHEEL LUBRICATION
[76] Inventor: Ernie C. Jones, Jr., Route 6, Box 348, Nacogdoches, Tex. 75961
[22] Filed: July 6, 1971
[21] Appl. No.: 160,025

[52] U.S. Cl.................. 184/14, 280/433, 308/136
[51] Int. Cl........................................... B62d 53/00
[58] Field of Search................................ 184/14, 38;
   248/119 S; 105/368 S; 308/135, 136, 137;
   280/125, 433, 438

[56] References Cited
UNITED STATES PATENTS

| | | | |
|---|---|---|---|
| 2,481,695 | 9/1949 | Scott | 308/137 |
| 3,622,173 | 11/1971 | Hodgson | 280/433 X |
| 2,915,320 | 12/1959 | Jewell et al. | 280/433 X |
| 2,665,177 | 1/1954 | Schaefer | 308/136 |
| 3,011,798 | 12/1961 | Gates | 308/136 X |
| 2,662,799 | 12/1953 | Schaefer | 308/136 |

FOREIGN PATENTS OR APPLICATIONS

| | | | |
|---|---|---|---|
| 836,941 | 3/1970 | Canada | 280/433 |

Primary Examiner—Manuel A. Antonakas
Attorney—Arthur E. Dowell, Jr. et al.

[57] ABSTRACT

The fifth-wheel construction for connecting a trailer body to a tractor includes a lower plate carried by the tractor and an upper plate carried by the trailer body. The upper plate carries the king pin engaging said lower plate. A lubricating tube is disposed within the trailer body above the upper plate and has discharge openings therein registering with holes through the upper plate disposed within the area of the lower plate and adjacent the king pin. The outer end of the tube extends to the front exterior of the trailer body, and fittings are provided at the outer end of the tube for forcing lubricant into the tube for distribution between the plates and around the king pin.

3 Claims, 5 Drawing Figures

TRAILER FIFTH-WHEEL LUBRICATION

DESCRIPTION OF INVENTION

This invention relates to trailer fifth-wheel assembly lubrication, and the principal object of the invention is to provide means for lubricating the upper and lower plates of the fifth-wheel assembly, also the king pin thereof, without requiring separation of the trailer or semi-trailer from the tractor or truck. According to my invention the lubricating means is housed entirely within or below the floor of the trailer or semi-trailer and involves the use of tubes which are disposed between the bottom plate of the trailer and the false inner floor thereof, which tubes discharge lubricant through the upper plate of the fifth-wheel assembly which is carried by the trailer or semi-trailer. According to my invention the tubes extend through the wall of the trailer or semi-trailer body at the front end thereof, one such tube being connected to a hand-operated grease gun which carries a grease cartridge and is adapted for manual grease application. Another of said tubes is connected to a grease fitting such as an alemite nipple for connection to a power grease line. Both the gun and the nipple are exposed at the front lower end of the trailer or semi-trailer body so as to be readily accessible by the operator from the exterior of the truck.

Another object of the invention is to provide a means for lubricating trailer fifth-wheel assemblies of the type above referred to, in which the grease may be forced in between the upper and lower plates of the fifth-wheel assembly and around the king pin thereof by the operator without necessitating detaching the trailer body from the truck or tractor, or requiring dollying-up of the front end of the trailer or semi-trailer body in the process of applying grease to the fifth-wheel assembly.

Heretofore, in order to lubricate fifth-wheel assemblies, it has been necessary for the truck driver to dolly-up the trailer body, to then pull the tractor out from under the trailer body in order that the operator may apply grease upon the top of the lower plate of the fifth-wheel assembly, then back the tractor again under the upper plate of the fifth-wheel which is carried by the trailer body, and then dolly-down the trailer body. Often during such process of lubricating the fifth-wheel assembly, it has been found that due to soft soil the trailer body while dollied-up has sunk down into the ground, so that when recoupling the truck or tractor to the trailer body the grease which has been applied upon the top of the lower plate of the fifth-wheel assembly will be engaged by the front end of the trailer body during recoupling, rubbing off such grease and depositing it on the front end of the trailer body at the front thereof, thereby leaving in fact very little grease upon the lower plate of the fifth-wheel assembly.

It is of course extremely dangerous to drive tractor trailers in which the fifth-wheel is not thoroughly lubricated. Often on trips it is found that the fifth-wheel is getting dry, thus making it hard to steer the vehicle. By using my novel lubricating means, however, it is possible at any time for the driver of the truck or tractor to apply grease upon the upper and lower plates of the fifth-wheel assembly utilizing either the hand-operated pump at the front of the trailer body which is readily accessible to the operator from the ground, or by utilizing a pressure grease line applied to the alemite nipple which is also exposed at the front lower end of the trailer body, which pressure lines are available at any filling station along the road. My lubricating means therefore makes is possible to lubricate or grease the fifth-wheel assembly more easily than by methods heretofore used, and obviates the necessity of having to separate the tractor from the trailer at any time.

Other minor objects of the invention will be hereinafter set forth.

I will explain the invention with reference to the accompanying drawings, which illustrate one practical embodiment thereof, to enable others familiar with the art to adopt and use the same; and will summarize in the claims, the novel features of construction, and novel combinations of parts, for which protection is desired.

Figure 4:
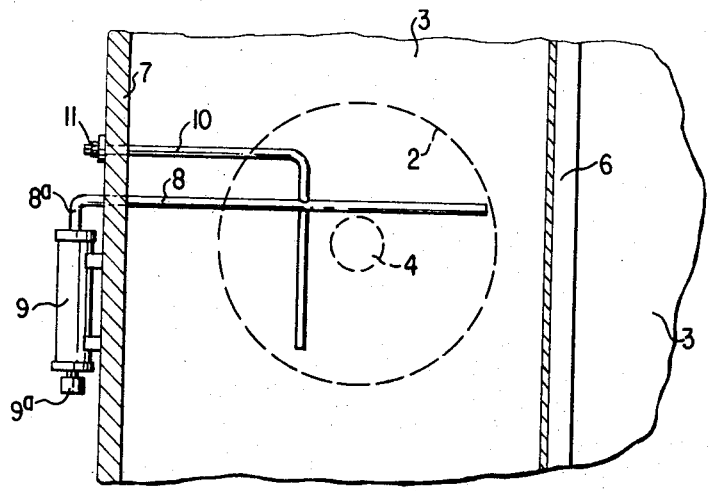
FIG. 4 is a horizontal section on the line 4—4, FIG. 3.
Figure 5:
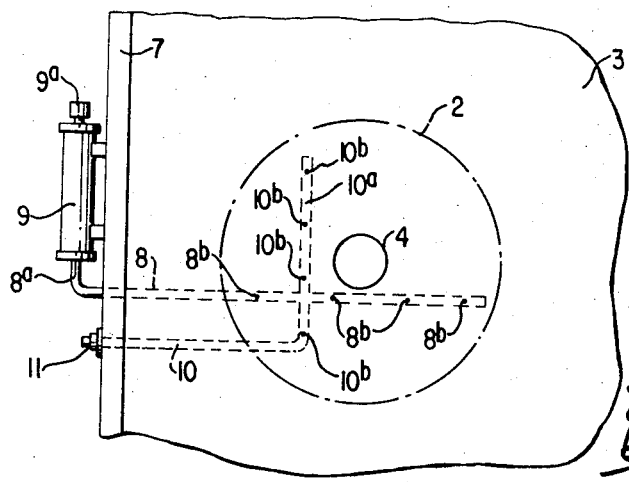
FIG. 5 is a bottom plan view of the front end of the trailer body, looking in the direction of the arrows 5—5, FIG. 3.

Referring to the drawings, the fifth-wheel assembly includes a lower plate 1 (FIG. 1) which is usually pivotally supported from the tractor A at the rear end thereof by means of journal blocks whereby the lower plate 1 is oscillatably supported on the rear of the tractor A for pivoting on an axis transverse to the longitudinal axis of the tractor. The fifth-wheel also includes an upper plate 2 (FIG. 1) which is usually supported from the forward end portion of the trailer or semi-trailer body B but which according to my invention is part of the metallic bottom plate 3 of the trailer B, and which is indicated in FIGS. 2, 4 and 5 by circle bearing the reference numeral 2, the circle 2 being concentric with the king pin 4 which is also carried by the bottom plate 3 at the center of the circle 2. The circle 2 is substantially of the same diameter as the diameter of the lower plate 1 of the fifth-wheel assembly. Thus in my construction the upper plate 2 of the fifth-wheel is in fact a part of the metallic bottom plate 3 of the trailer body B. Preferably the metallic bottom plate 3 of the trailer is of sufficient thickness so that the portion 2 thereof which forms the upper plate of the fifth-wheel will not be damaged in use, the portion 2, as above stated, carrying the king pin 4.

Figure 1:
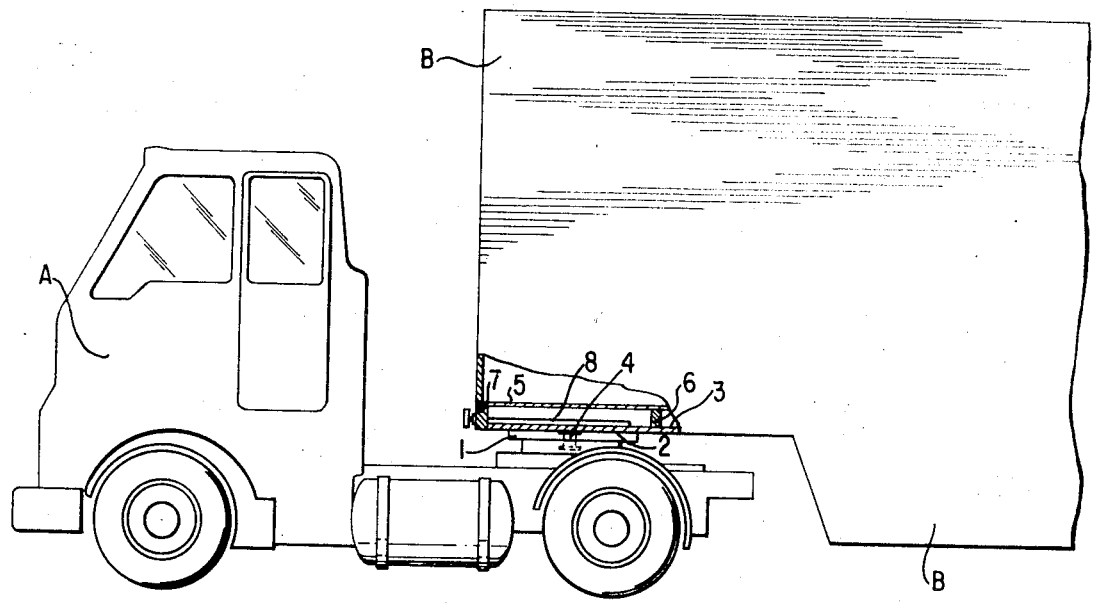
FIG. 1 is a front elevational view of a tractor-trailer, partly broken away to illustrate my novel fifth-wheel lubricating means.
Figure 2:
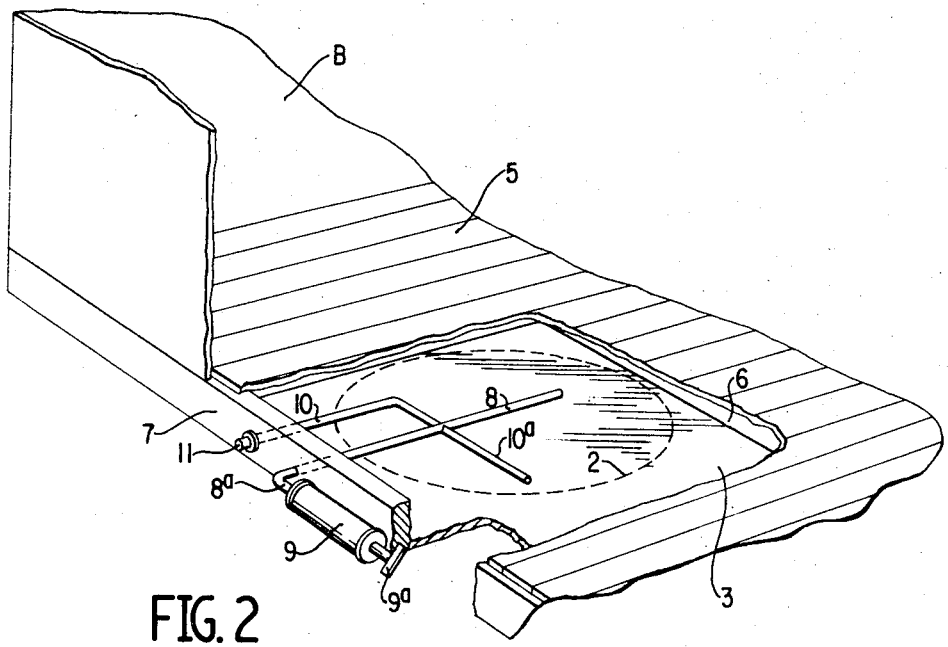
FIG. 2 is an enlarged perspective view of the front end of the trailer body, in which the flase floor of the body is broken away to show my lubrication tubes and their fittings.
Figure 3:
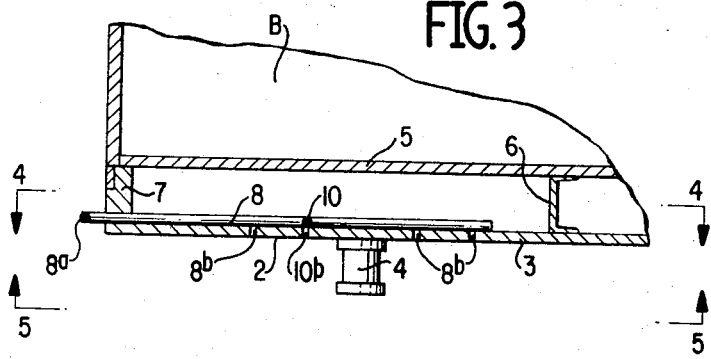
FIG. 3 is an enlarged vertical sectional view through the front end of the trailer body showing the false flooring, the arrangement of grease tubes, the king pin of the fifth-wheel, and the bottom plate of the trailer body.

Within the trailer body B above the bottom plate 3 is the body false flooring 5 of any suitable type, which is, as shown in FIGS. 1 and 3, disposed above the bottom plate 3 of the trailer B, the flooring being supported upon transverse frames 6 or the like, which may comprise channel irons as shown in FIGS. 1-4 at spaced intervals. The front end of the false flooring 5 is supported upon a wooden or other frame member 7, as shown in the drawings, so as to maintain the spacing between the flooring 5 and the bottom plate 3 of the trailer B at the front end thereof.

My novel lubricating means consists of a tube 8 which is welded or otherwise secured to the bottom plate 3 of the tractor B and which is disposed parallel with the longitudinal axis of the trailer, with its front end passing through the frame member 7 at the front end of the trailer, as shown in FIGS. 2 and 5. The projecting front end of the tube 5 is bent at right angles, as at 8a, and is connected to a grease gun 9 adapted to be manually manipulated, the same carrying a grease cartridge, not shown, whereby as the handle 9a of the gun is actuated grease from the cartridge within the gun 9 will be forced through the tube 8 and will be deposited through openings in the tube 8, FIG. 5, through registering holes 8b in the plate 3, and forced between the upper plate 2 and the lower plate 1 of the fifth-wheel assembly, the holes 8b being disposed within the area 2 of the bottom plate 3 and adjacent the king pin 4, as shown in FIG. 4, since the tube 2 is disposed closely adjacent thereto.

Where a pressure grease line is available, such as at a service station, I provide a second grease tube 10 which is welded to the bottom plate 3 of the trailer and which extends through the front frame member 7 of the trailer body and has at its outer end a nipple 11, such as an alemite nipple, whereby grease under pressure may be forced into the tube 10. Tube 10 is normally disposed parallel with tube 8, but its inner end is bent at right angles as at 10a across the circle 2 and is provided with holes registering with holes 10b which pass through the upper plate portion 2 of the bottom plate 3 of the trailer, the holes 10b being evenly spaced as shown in FIG. 3 and being disposed adjacent the king pin 4 in a manner similar to the holes 8b of tube 8.

Thus, when it is desired to lubricate the fifth-wheel the driver will not have to separate the trailer body B from the tractor A, or dolly-up the front end of the trailer B in order to apply grease upon the lower plate 1 of the fifth-wheel assembly, since by using my system the driver merely has to stop the vehicle and without separation of the trailer from the tractor merely operate the grease gun 9 or, if at a service station, attach the power grease line to the alemite nipple 11 and thus force grease under pressure between the upper and lower plates of the fifth-wheel assembly and around the king pin 4, all parts of my lubrication system being carried by the trailer body instead of being carried by the tractor body.

Thus my novel system provides a safety means for maintaining the fifth-wheel assembly lubricated at all times and provides a system which can be operated easily and at a minimum cost without sacrificing space for the system within the body of the trailer. The driver of the vehicle when using my lubricating system would be able to grease the fifth-wheel assembly whenever he feels it begin to dry, in order to keep his rig as safe as humanly possible, not only for his safety but for the safety of other motorists that will be on the highway, since the fifth-wheel assembly must be well greased at all times.

I claim:

1. A trailer fifth-wheel construction for connecting a trailer body to a tractor, comprising a lower plate carried by the tractor; an upper plate carried by the trailer body and having a king pin engaging said lower plate; a lubricating tube disposed within the trailer body above the said upper plate having discharge openings therein registering with holes through the upper plate disposed within the area of the lower plate and adjacent the king pin; the outer end of said tube extending to the exterior of the trailer body; and means at the outer end of said tube for forcing lubricant into said tube for distribution between said plates and around the king pin, said trailer having a front wall, and having a metal bottom plate a portion of which forms the upper plate of the fifth-wheel; said tube being secured to the upper face of the bottom plate with its outer end extending through a wall of the trailer body and its main portion disposed within the area of the lower plate and adjacent the king pin.

2. In a construction as set forth in claim 1, said means comprising a manually operable grease gun.

3. In a construction as set forth in claim 1, said means comprising a grease nipple for attachment to a power grease line.

* * * * *